United States Patent [19]

Burk

[11] 4,315,083

[45] Feb. 9, 1982

[54] PROCESS FOR THE CONTINUOUS MASS POLYMERIZATION OF POLYBLENDS

[75] Inventor: Raymond D. Burk, Wilbraham, Mass.

[73] Assignee: Monsanto Company, St. Louis, Mo.

[21] Appl. No.: 150,274

[22] Filed: May 15, 1980

[51] Int. Cl.³ .................. C08F 279/02; C08F 279/04; C08L 51/04

[52] U.S. Cl. ...................................... 525/53; 525/99; 525/237; 525/316

[58] Field of Search .................... 525/99, 237, 53, 316

[56] References Cited

U.S. PATENT DOCUMENTS

| | | | |
|---|---|---|---|
| 3,658,946 | 4/1972 | Bronstent et al. | 525/53 |
| 3,660,535 | 5/1972 | Finch et al. | 525/53 |
| 3,676,527 | 7/1972 | Babcock et al. | 525/53 |
| 3,903,202 | 9/1975 | Carter et al. | 525/53 |
| 3,907,939 | 9/1975 | Durst | 525/99 |
| 4,146,589 | 3/1979 | Dupre | 525/53 |
| 4,252,911 | 2/1981 | Simon | 525/53 |

*Primary Examiner*—William F. Hamrock
*Attorney, Agent, or Firm*—Joseph S. Nelson; William J. Farrington; Paul D. Matukaitis

[57] ABSTRACT

The present invention relates to an improved process for the continuous mass polymerization of solutions comprising alkenyl aromatic monomers having about 1 to 10% by weight of a polybutadiene rubber dissolved therein, the steps comprising, (A) continuously charging said solution to a first reaction zone operating at about 10 to 40% conversion forming a first partially polymerized mixture, (B) continuously charging said first mixture to a second reaction zone operating at about 50-90% conversion forming a second partially polymerized mixture, and finally, (C) separating the residual monomer from said second mixture providing a polyblend of a matrix phase of said monomers having polybutadiene rubber particles grafted with said monomers dispersed therein, the improvement comprising: charging a monomer-polybutadiene solution in step (A) having in addition about 1 to 10% by weight of a diene block copolymer and about 1 to 20% by weight of a polymer of said monomers dissolved in said solution followed by carrying out steps (B) and (C) to provide a polyblend of a polymer of said monomers having dispersed therein rubber particles grafted with said monomers, said rubber particles containing said polybutadiene and diene block copolymer rubbers and forming a gel phase of said rubber particles containing grafted and occluded polymers of said monomers in an amount of about 0.5 to 5 parts per part of total rubber.

22 Claims, No Drawings

4,315,083

1

PROCESS FOR THE CONTINUOUS MASS POLYMERIZATION OF POLYBLENDS

BACKGROUND OF THE INVENTION

It is known to polymerize solutions comprising alkenyl aromatic monomers having a diene rubber dissolved therein to form polyblends having a matrix phase of polymers of said monomers having dispersed therein particles of said diene rubber grafted with said monomers.

Mass and mass/suspension processes have been used to prepare such polyblends. U.S. Pat. No. 3,903,202 is one such suitable process for the continuous mass polymerization of such polyblends and it is hereby incorporated by reference.

The morphology of the rubber particles dispersed in the polyblend is critical to the final properties of the polyblend. Generally, the larger the size of said rubber particles, the greater the toughness and the smaller the size, the higher the gloss. Hence, the size of the rubber particles must be controlled to insure the control of the properties of the polyblend. U.S. Pat. No. 3,903,202 discloses that agitation during the early phases of polymerization disperses the dissolved rubber as particles and that higher rates of agitation generally decreases the size of said particles with lower rates of agitation producing larger particles.

Beyond the rubber particle size morphology and its contribution to toughness, it has been found that the internal morphology of the particle is also important to the rubber efficiency in toughening rubber reinforced polyblends.

It has been found that the greater the amount of grafted and occluded polymer produced in the rubber particle the greater its effective volume fraction becomes per concentration of rubber, hence, the greater its toughening efficiency. The total rubber, including graft and occlusions, is commonly called the gel content or insoluble portion of the polyblend when dissolved in a solvent for the matrix polymer phase.

The prior art continuous mass polymerization processes have attempted to increase the gel phase of polyblends by running the first reaction zone at less than about 15% conversion to occlude more monomer in the rubber phase as it is dispersed in the first reaction zones as disclosed in U.S. Pat. No. 3,658,946. Such processes require a plurality of reaction zones, i.e., three to four, since the first stage reaction zone only converts about 2 to 10% of the monomers and additional stages are required to finish the polymerization with heat and temperature control. Capital and energy costs become prohibitive in today's technology. U.S. Pat. No. 3,660,535 discloses a continuous mass process for rubber monomer solutions wherein the solutions are moved through stratified or plug flow reaction zones starting at zero conversion and ending at essentially 99% conversion through a plurality of staged reactors.

This process differs from that of U.S. Pat. No. 3,658,946 in that it is plug flow gradual polymerization having a gradual inversion of the rubber phase as the solution is polymerized from 0 to about 15 to 20% conversion. The process of U.S. Pat. No. 3,658,946 operates with steady-state polymerization reactors wherein the monomer-rubber solution enters a first reactor operating at less than 16% conversion and precipitates and disperses the rubber phase instantaneously with large amounts of occluded monomer in the rubber particles and then feeds the solution to subsequent reactors each operating at steady state conversion in stepwise fashion.

The present process differs from U.S. Pat. No. 3,658,946 process in that the first reaction zone is operating at an efficient 20 to 45% conversion and the monomer-rubber-polymer stream enters and disperses as a rubber particle having monomer and polymer occluded in the particle. It has been discovered that this monomer solution can be fed to high conversion efficient first reaction zones because the polymer in the reaction will not partition occluded monomers or polymer from the particles because the polymer in the particles holds the monomer in the particles having as high an affinity for the monomer as the polymer already formed in the reaction zone. In addition the block copolymers have the ability to hold the monomers and polymer in the rubber phase having a polybutadiene end compatible with the rubber phase and a polystyrene end compatible with the monomer and polymers to hold them in the rubber phase particles.

The present invention then provides a continuous process for preparing polyblends having increased rubber efficiency without using a large number of staged reactors. Efficient polymerization is provided in only two efficient polymerization zones running at high conversions and poly rates yet providing the polyblend produced with high rubber gel fractions.

It is the objective of the present invention to provide a process that will produce a rubber phase in polyblends and have an increased rubber volume fraction as a gel wherein larger amounts of grafted and occluded polymers are present in amounts of 1 to 5 parts per part of rubber.

It is the objective of the present invention to provide a continuous process wherein rubber-polymer-monomer solutions are polymerized in steady-state, flow-through, polymerization zones such that volume fraction of the rubber phase is increased beyond the contribution of the rubber moiety charged.

SUMMARY OF THE INVENTION

The present invention relates to an improved method for the mass polymerizing of a solution comprising an alkenyl aromatic monomer having a polybutadiene rubber dissolved therein, the steps comprising:

A. continuously charging said monomer solution having 1 to 10% of a polybutadiene rubber dissolved therein to a first reaction zone operating at steady state polymerization of about 20 to 45% of said monomers to a first partially polymerized mixture, said mixture being said monomer having polymers of said monomer and polybutadiene rubber particles grafted with said monomer dispersed in said monomers, B. continuously charging said partially polymerized mixture to a second reaction zone operating at a final polymerization of about 50 to 85% of said monomer forming a second partially polymerized mixture, C. continuously separating the residual monomer from said second mixture providing a matrix phase polymer of said monomer having said grafted rubber particles dispersed therein, said improvement comprising: charging a monomer-polybutadiene solution in step (A) having in addition about 1 to 10% of a diene block copolymer and about 1 to 20% by weight of a polymer of said monomer dissolved in said solution followed by carrying out steps (B) and (C) to form a polyblend of said matrix phase polymer having rubber particles grafted with said monomers dispersed therein, said rubber particles containing rubbers consisting of polybutadiene and diene block copolymer, said rubber particles being a gel fraction in said polyblend containing grafted and occluded polymers of said monomers in amount of about 0.5 to 5 parts per part of total rubber.

PREFERRED EMBODIMENTS

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

The alkenyl aromatic monomer can be used in combination with comonomers such as alkenyl nitrile; e.g., acrylonitrile methacrylonitrile, etc., or acrylates such as acrylic acid, methacrylic acid, methyl methacrylate, etc.

The styrene-acrylonitrile monomers having, 1 to 15% by weight a diene rubber dissolved therein, can be continuously mass polymerized to polyblends known as ABS. Such polyblends can contain styrene and acrylonitrile type monomers in weight ratios of about 90:10 to 50:50 respectively, preferably 80:20 to 70:30 by weight.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5-dimethyl-2,5-di-(tert-butylperoxy) hexane, 2,5-dimethyl-2,5-di(tert-butylperoxy) hexane-3 or hexyne-3, tert-butyl hydroperoxide, cumene hydroperoxide, p-menthane hydroperoxide, cyclopentane hydroperoxide, pinane hydroperoxide, 2,5-dimethylhexane-2,5-dihydroperoxide, etc., and mixtures thereof.

The catalyst is generally included within the range of 0.001 to 3.0% by weight and preferably on the order of 0.005 to 1.0% by weight of the polymerizable material, depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. From 2 to 20% diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as platicizers, lubricants, colorants and non-reactive preformed polymeric materials which are suitable or dispersible therein.

THE RUBBER SUBSTRATE

Exemplary of the various rubbers onto which the polymerizable monomer formulation can be grafted during polymerization in the presence thereof to produce the graft copolymers are diene rubbers, natural rubbers, ethylene-propylene terpolymer rubbers, acrylate rubbers, polyisoprene rubbers and mixtures thereof, as well as interpolymers thereof with each other or other copolymerizable monomers.

The preferred substrates, however, are diene rubbers (including mixtures of diene rubbers), i.e., any rubbery polymer (a rubbery polymer having a second order transition temperature not higher than 0° centigrade, preferably not higher than −20° centigrade, as determined by ASTM Test D-746-52T) of one or more of the conjugated, 1,3 dienes, e.g. butadiene, isoprene, 2-chloro-1,3 butadiene, 1 chloro-1,3-butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrenes, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; arcylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2.0% of a crosslinking agent, based on the weight of the rubber-forming monomer or monomers, crosslinking may present problems in dissolving the rubber in the monomers for the graft polymerization reaction. In addition, excessive crosslinking can result in loss of the rubber characteristics.

A preferred group of rubbers are the stereospecific polybutadiene rubbers formed by the polymerization of 1,3-butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° to −105° C. as determined by ASTM Test D-746-52T.

GRAFTED RUBBER PHASE

A monomer composition comprising at least one monoalkenyl aromatic monomer having about 1–10% by weight of a diene rubber, 1–10% of a diene block copolymer and 1–20% of a polymer dissolved therein is charged continuously as a monomer-rubber solution to the initial reaction zone. The monomer is polymerized at temperatures of about 110°-145° C. in the first zone converting about 20-45% by weight of the monomer to a alkenyl aromatic polymer, already described, as a first polymer. At least a portion of the first polymer polymerized is grafted as polymer molecules to the diene rubber as superstrate.

The diene block copolymers are those having greater than 50% by weight of a conjugated diene monomer, as disclosed supra, as a diene block copolymerized with a alkenyl aromatic monomeric polymer as a block segment of the polymer. The diene block copolymers then are preferably, polybutadiene-polystyrene or polystyrene-polybutadiene-polystyrene in copolymeric structure and have the following molecular structure:

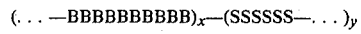

$(\ldots-BBBBBBBBBB)_x-(SSSSSS-\ldots)_y$ wherein B represents butadiene and S represents styrene, X represents from 55 to 90 preferably 60 to 80 and y represents 10-45 preferably 20 to 40% by weight of each monomer in the block copolymer. The diene block copolymers are available commercially and have a Mooney viscosity (ML +4 at 100° C.) of about 35 to 55 or an intrinsic viscosity in toluene of about 1 to 5. The diene block copolymers are present in the monomer-rubber solution in amounts of about 1 to 10% by weight in combination with about 1 to 10% by weight of polybutadiene and 1 to 20% by weight of polymers of the cited monomers, such as, alkenylaromatic or mixtures of alkenyl aromatic and alkenyl nitrile monomers.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

The remainder of the first polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the glass of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the initial polymerization zone, the continuously charged monomer composition disperses rapidly under stirring, forming the rubber-monomer-polymer particles which on complete polymerization form discrete rubber particles. The conversion of monomers to polymers in the first reaction zone is controlled between 20-45% and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a first polymer in the first reaction zone which aids its dispersion and stabilizes the morphology of the particle. During the dispersion of the rubber-monomer-polymer particles, monomer-polymer phase is occluded within the particle. The total amount of occluded monomer-polymer phase and grafted polymer present in the particles can be from about 1 to 5 grams for each gram of said diene rubber and diene block copolymer.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 2 to 15% as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J. et. al., "Size Analysis of Subsieve Powders Using a Centrifugal Photosedimentometer", British Chemical Engineering 9:742-744 (1964). A Model 3000 Particle Size Analyzer from Martin Sweets Co., 3131 West Market Street, Louisville, Ky. was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the initial reactor, one must (1) form and disperse the rubber particle and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial reaction zone and throughout the total polymerization process. The rubber particle is also grafted externally stabilizing its structure as to size and its dispersibility in the monomer-polymer phase.

The initial reactor forms a first mixture or partially polymerized solution of a monomer-polymer phase having the rubber phase described dispersed therein. The first mixture can be charged to a staged isobaric reaction zone as a second zone and described herein. The first mixture is polymerized by progressive multistage substantial linear flow polymerizations with the conversion of polymer advancing from about 20–45% conversion in the first stage to 50 to 90% conversion in the final stage of the staged isobaric stirred reaction zone as a second zone. This provides a gradual progressive increase of polymer in the monomer-polymer phase. This has been found to be important in maintaining the morphology or structure of the dispersed rubber-monomer particles.

It has been found unexpectedly that in the initial reaction zone as the rubber particle is formed, that the rubber-monomer particle has a monomer content that corresponds to the monomer content of the monomer-polymer phase. The rubber-monomer particle will stabilize at this level as the monomer polymerizes inside the rubber particle and grafted polymer is formed on the outside. Hence, it has been found that the lower the level of conversion or polymer in the monomer-polymer phase of the initial reactor the higher the amount of monomer found in the rubber-monomer particles formed as the rubber solution is charged and dispersed in the monomer-polymer phase. Conversely, if the conversion is high in the initial stage less monomer is occluded in the rubber phase particle on dispersion.

The present invention overcomes this problem by adding block copolymer rubbers and polymers of the monomers used in the monomer solution to the monomer solution having the polybutadiene rubber dissolved therein. It has been discovered that the first reaction zone can be run at a high steady-state polymerization conversion of about 20-45% to obtain efficient polymerization rates yet retain increased amounts of polymer and monomer in the rubber phase particles as they are formed and dispersed in the partially polymerized mixture being formed continuously in the first backmixed, non linear reaction zone.

It has been found that the diene block copolymer rubbers are compatible in the monomer-polybutadiene rubber solution and in turn compatibilize the polymer and monomers associated with the rubber phase such that the rubber phase will disperse essentially instantaneously in the partially polymerized mixture as monomer-rubber globules due to the interfacial activity of the diene block copolymers. Hence, the diene block copolymers are acting as a dispersing aid as to rubber phase and is also inhibiting any partitioning of the occluded monomers and polymers from the rubber phase into the partially polymerized mixture, hence, giving a rubber phase of larger volume as dispersed increasing rubber toughening efficiency and improving polyblend properties as a product of the present process and adding to the utility of the process, i.e., a low cost, highly efficient process that overcomes the problems of the prior art continuous processes.

As described earlier, the first mixture can be polymerized in the staged linear flow second zone and the percent by weight of polymer being formed is progressively higher with each stage having a slightly higher polymer content. The staged linear progressive polymerization was found not only to control the polymerization of the monomer giving desirable polymers but was found unexpectedly to preserve the integrity of the rubber particles. Although not completely understood, as the rubber particle becomes grafted and the monomer-polymer phase forms in the occluded monomer of the rubber particle, the monomer is not readily extracted from the rubber particle by the monomer-polymer phase as the polymer content increases gradually in the monomer-polymer phase during polymerizing in the staged reactor. It is thought that since the polymerization in the multistaged linear reaction zone is so gradual that polymer is being formed in both the rubber particle and the monomer-polymer phase at about the same rate, hence, the total polymer content of the occluded monomer-polymer phase of the rubber particle is about the same as polymer content of the monomer-polymer phase and monomer is not extracted, hence, the weight percent of occlusion is stabilized and remains substantially constant after formation in the initial reactor.

It has been found possible to analyze the amount of total occluded polymer phase and grafted polymers. The final polymerized polyblend product (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\% \text{ Dry gel in Polyblend} = \frac{\text{Weight of dry gel}}{\text{Weight of polyblend}} \times 100$$

$$\left.\begin{array}{l}\% \text{ Graft and}\\ \text{Occlusions}\\ \text{in Rubber}\end{array}\right\} = \frac{\% \text{ dry gel} - \% \text{ rubber}}{\text{Percent rubber*}} \times 100$$

$$\left.\begin{array}{l}\text{Parts** by weight}\\ \text{of graft polymer}\\ \text{and occluded poly-}\\ \text{mer per unit weight}\\ \text{of rubber}\end{array}\right\} = \frac{\% \text{ dry gel} - \% \text{ rubber}}{\text{Percent rubber}}$$

*Percent rubber determined by infra-red spectrochemical analysis of the dry gel
**The present invention preferably has present about 0.5 to 5 grams of occluded and grafted polymer per gram of diene rubber particle.

The swelling index of the rubber graft particles is determined by taking the dry gel above and dispersing it in toluene for 12 hours. The gel is separated by centrifuge and the supernatant toluene drained free. The wet gel is weighed and then dried in vacuum oven for 12 hours at 50° C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle during steps (A) and (B). Generally, the conversion of monomer to polymer in the occlusion follows the rate of conversion of monomer to polymer in the monomer-polymer phase being carried out in steps (A) and (B). The rubber particles can become crosslinked by heating the second mixture to from about 200° to 250° C. during step (C) for sufficient time to crosslink the rubber particles such that they have a swelling index of from about 7 to 20 preferably from about 8 to 16.

Preferably, the combined polymer of the matrix phase of the polyblends produced by this invention have a dispersion index (Mw/Mn), wherein Mw is a weight average molecular weight and Mn is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The weight average molecular weight of the combined polymer of the matrix phase preferable range from 150,000 to 300,000.

SECOND REACTION ZONE POLYMERIZATION

The second reaction zone polymerization can be carried out in a staged isobaric stirred reaction zone maintaining conditions so as to polymerize said first mixture by progressive multistage substantially linear flow polymerization all said stages operating with shearing agitation and common evaporation vapor phase cooling under isobaric conditions in said second reaction zone, providing each said stage with steady state polymerization at controlled temperature and interfacial liquid contact stage to stage establishing a hydraulic pressure gradient from the first stage downstream to the final stage causing substantially linear flow through said second zone, all said stages operating at predetermined conversion levels producing a composite polymer as a second polymer in said second reaction zone having a predetermined molecular weight distribution and average molecular weight maintaining the structural integrity of said dispersed rubber particle, said second zone producing a second mixture having a total polymer content being determined by said multistage steady state polymerization and evaporation of said monomers.

The reactor operates under controlled isobaric conditions. For the range of temperatures normally of interest for alkenyl aromatic monomers, e.g. styrene polymerization (130°-180° C.), the operating pressure will range from 7 to 28 psia. The styrene reaction is exothermic and cooling is provided primarily by vaporization of a part of the monomer from the reacting mass. Further cooling can be provided by a jacket. Cooling by the condensed recycle monomer feeding into either the first or second reaction zone is also provided. The mass is in a boiling condition and temperature is determined by the natural relationship between vapor pressure and boiling point. This relationship is also a function of the relative amounts of polymer, monomer and other substances (e.g. dissolved rubber, solvents and additives). Since, as material progresses through this reactor the amount of polymer continuously increases and the amount of monomer corresponding decreases via polymerization and monomer content further decreases due to vaporization loss, the temperature progressively increases from inlet to outlet stages.

To accommodate the natural swell of the boiling mass and to provide space for vapor disengagement, the reactor is usually run at a fillage of about 10 to 90% preferably 40 to 60% of its volume.

Vapor passes out of the reactor to an external condenser where it is condensed and may also be subcooled. This condensate may then be handled in several ways, for example:

1. If the reactor used this invention is preceded by another reactor in a multi-reactor train, the condensate may be returned to a preceding reactor.

2. The condensate may be returned to the inlet compartment of the reactor used this invention, wherein it is reheated by condensation of a fraction of the previously evolved vapors and mixed other incoming free materials.

In a multi-compartment staged reactor, each stage is well mixed and the reaction mass is substantially homogeneous within itself. The discs which separate the stages discourage backflow of material between compartments. The clearance between disc and shell does permit some backflow and also permits the necessary forwarding of material through the compartments from reactor inlet to outlet giving substantially linear flow.

In a compartmented staged reactor as here described, the first stage has a relatively low conversion level, since it is being continuously fed by monomer and low conversion prepolymerized syrup. However, the rate of conversion in this stage is relatively high because of the high concentration of monomer.

In each succeeding stage, the conversion level is higner than in the preceding one, which tends to lower the rate of conversion. Offsetting this effect, however, are the facts that the temperature is higher and that monomer is being vaporized out of the mass. Thus, the total conversion to polymer obtained per unit fillage volume of the staged reactor is higher than that which could be obtained in a single stage reactor producing an equal final conversion level at equal temperature.

Clearance between rotating disc compartment baffles and cylindrical wall may be from 1 to 10% of shell radius, the larger values being appropriate to the high conversion end of the reactor where viscosity is at maximum. Stage to stage forward flow of the polymerizing first mixture is through this clearance and vapor from the polymerizing first mixture also counterflow through the clearance, above the surface level of the mass.

If the alkenyl monomer is used in combination with an alkenyl nitrile monomer, operations are essentially the same except for controlling the styrene-acrylonitrile composition of the monomers during polymerization. The styrene type monomer adds to the copolymer at a faster rate than the acrylonitrile monomer, hence, the acrylonitrile monomer is generally charged at higher weight percentages in the charged monomer formulation to insure a desired weight percent in the polymerized copolymer. The two monomers form an azeotrope at about 75% styrene and 25% acrylonitrile so that no shift in monomer or polymer composition occurs during polymerization, hence, generally the azeotropic monomer mixture is used in the continuous mass polymerizing of ABS polyblends from monomer-rubber solutions.

The polyalkenyl aromatic monomer polymer or copolymer to be dissolved in the monomer-rubber solutions to be fed in step (A) is preferably a polystyrene type polymer or styrene-acrylonitrile type copolymer having a weight average molecular weight of about 20,000 to 300,000 preferably about 150,000 to 250,000.

The matrix polymer or copolymer can have a weight average molecular weight of about 150,000 to 300,000.

The amount of polymer or copolymer to be added is dependent on the particle size desired in the polyblend. Generally, the more polymer present, the larger is the rubber particle size as dispersed. The amount to be used is also based on the amount of rubber dissolved in the monomer to be fed in step (A). The amount of polymer or copolymer present in the monomer-rubber solution is about 1 to 20% by weight based on the monomer solution.

The following examples are set forth to more clearly illustrate the principles and practice of the present invention. They are intended to be illustrative and not limiting as to the scope of the invention.

EXAMPLE 1—CONTROL

A monomer composition consisting of 5 parts by weight of stereospecific polybutadiene rubber in 95 parts by weight of styrene monomer is prepared by agitating the mixture at 40° C. for 8 hours. The rubber used contains approximately 35% cis-1,4 structure; approximately 55% trans-1,4 structure and approximately 10% vinyl-1,2 structure having a Mooney viscosity of the rubber (ML-4, 212° F.) at 55. To the above monomer composition is added 0.5 parts of white mineral oil, 0.1 part by weight of octadecyl 3-(3',5'-di-tertbutyl-4-hydroxyphenyl) propionate and 40 parts by weight of recycled styrene monomer. This monomer composition is fed continuously at approximately 145 lbs./hr. to a 100-gal. anchor agitated initial reactor operated at approximately 50% fillage and 124° C. under 5 psig. nitrogen pressure. The agitator is approximately 31 inches wide and turns at 65 rpm. A first mixture containing approximately 20% polystyrene is pumped from the above reactor at a continuous rate such as to maintain essentially constant fillage therein and flows to the inlet of the second reactor, a staged isobaric stirred reactor. The second reactor has approximately a 50 gal. capacity and operates at about 40% fillage.

The reactor is about 53 inches long. The agitator consists of a horizontal shaft on which are fixed a series of paddles about 2 inches wide alternating at right angles to one another in a manner similar to that shown in U.S. Pat. No. 3,903,202. Along the shaft and rotating with it are four circular discs with an average radial wall clearance of about three-eighth inch rotating at 15 rpm. These discs are positioned to divide the reactor into five stages of approximately equal volume. The pressure in this reactor is maintained at approximately 20 psia.

The second mixture in the final stage is maintained at about 166° C. and contains about 62% polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240° C. and enters a devolatilizer chamber maintained at 50 torr. Second mixture volatile vapors exiting the devolatilizer chamber are condensed and recycled to the first reactor preheater feed system. Approximately 3 lbs./hr. of the condensed devolatilized vapors are withdrawn as purge. The devolatilized melt is fed from the devolatilizer chamber to an extruder which forms it into a plurality of strands which are then cooled and cut into pellets. The combined polymer has a molecular weight of about 210,000 and a dispersion index about 3.1.

| Typical Properties | |
| --- | --- |
| Izod Impact ½" × ½" bar 73° F. (ft.lb./in.) | 1.0 |
| Tensile strength at yield (lb.in.) | 3800 |
| Tensile strength at fail (lb./in.) | 3750 |
| Tensile elongation at fail (%) | 62 |
| Swelling index | 9 |
| Parts graft and occlusions/rubber | 1.43:1 |
| Rubber particle size (microns) | 1.5 |

EXAMPLES 2–18

Example 1 was repeated using varying amounts of polybutadiene, diene block copolymers, polymer and monomers as the solution charged to the process to illustrate the gel fraction of the polyblends can be increased by novel feed streams to back-mixed, steady state polymerization reaction zone operating at about 20 to 45% conversion. Formulations shown in parts and test data are tabulated in Table I.

TABLE I

| Ex. | PBD Rubber[1] | Block Copolymer Rubber[2] | Parts Monomers[3] | Monomer Polymer[4] | Izod Impact Strength | % Gel |
| --- | --- | --- | --- | --- | --- | --- |
| 1 | 5 | 0 | 95(S) | 0 | 1.0 | 12.5 |
| 2 | 4 | 1 | 91(S) | 4 | 1.37 | 13.3 |
| 3 | 3 | 2 | 91(S) | 4 | 1.51 | 15.1 |
| 4 | 7 | 0 | 93(S) | 0 | 1.62 | 18.2 |
| 5 | 5 | 2 | 87(S) | 6 | 1.83 | 20.1 |
| 6 | 4 | 3 | 87(S) | 6 | 1.85 | 21.6 |
| 7 | 10 | 0 | 90(S) | 0 | 1.85 | 24.0 |
| 8 | 5 | 5 | 85(S) | 5 | 2.51 | 29.2 |
| 9 | 5 | 5 | 90(S) | 0 | 2.33 | 26.0 |
| 10 | 5 | 5 | 81(S) | 9 | 2.73 | 31.6 |
| 11 | 5 | 0 | 95(S/AN) | 0 | 2.30 | 13.2 |
| 12 | 4 | 1 | 91(S/AN) | 4 | 2.61 | 15.5 |
| 13 | 3 | 2 | 91(S/AN) | 4 | 2.75 | 17.4 |
| 14 | 10 | 0 | 90(S/AN) | 0 | 4.10 | 22.6 |
| 15 | 5 | 5 | 90(S/AN) | 0 | 4.34 | 25.6 |
| 16 | 5 | 5 | 81(S/AN) | 9 | 6.23 | 33.0 |
| 17 | 10 | 10 | 62(S/AN) | 15 | 8.50 | 52.0 |
| 18 | 10 | 10 | 62(S) | 15 | 4.3 | 49.1 |

[1]Polybutadiene Rubber
[2]Block copolymer rubber-butadiene-styrene (70/30)
[3]Monomer (S) is styrene - S/AN is styrene-acrylonitrile
[4]Monomer polymer is polymer of monomers used in [3], i.e., (A) polymerizes to polystyrene and S/AN to poly SAN
[5]Gel is the total amount of insoluble rubber phase including graft and occluded polymer as described supra.

It is evident from the data that diene block copolymers added to the monomer feed stream provide higher levels of graft and occlusions as gels, however, the greatest gain is found by including polymers of the monomers in the feed stream to insure the placing of polymeric occlusions in the rubber particle to increase rubber toughening efficiency.

What is claimed is:

1. In an improved method for the mass polymerizing of a solution comprising an alkenyl aromatic monomer having a polybutadiene rubber dissolved therein, the steps comprising:

A. continuously charging said monomer solution having 1 to 10% by weight of a polybutadiene rubber dissolved therein to a first reaction zone operating at steady state polymerization of about 20 to 45% of said monomers to a first partially polymerized mixture, said mixture being said monomer having polymers of said monomer and polybutadiene rubber particles grafted with said monomer dispersed in said monomers, B. continuously charging said partially polymerized mixture to a second reaction zone operating at a final polymerization of about 50 to 85% of said monomer forming a second partially polymerized mixture, C. continuously separating the residual monomer from said second mixture providing a matrix phase polymer of said monomer having said grafted rubber particles dispersed therein, said improvement comprising: charging a monomer-polybutadiene solution in step (A) having in addition about 1 to 10% by weight of a diene block copolymer and about 1 to 20% by weight of a polymer of said monomer dissolved in said solution followed by carrying out steps (B) and (C) to form a polyblend of said matrix phase polymer having rubber particles grafted with said monomers dispersed therein, said rubber particles containing rubbers consisting of polybutadiene and diene block copolymer, said rubber particles being a gel fraction in said polyblend containing grafted and occluded polymers of said monomers in amount of about 0.5 to 5 parts per part of total rubber.

2. A process of claim 1 wherein said alkenyl aromatic monomer is selected from the group consisting of styrene, a-methyl styrene, chlorostyrene, dichlorostyrene, bromostyrene or dibromostyrene and mixtures thereof.

3. A process of claim 1 wherein said diene rubber is selected from the group consisting of polybutadiene, polyisoprene, poly-2-chlorobutadiene, poly-1-chlorobutadiene, copolymers and block copolymers of butadiene-styrene, butadiene-chloroprene, chloroprene-styrene, chloroprene-isoprene, 2-chlorobutadiene-1-chlorobutadiene and mixtures thereof.

4. A process of claim 1 wherein said diene rubber is polybutadiene.

5. A process of claim 4 wherein said polybutadiene rubber has a cis isomer content of about 30 to 98% and a Tg range of from about −50° C. to −105° C.

6. A process of claim 1 wherein said alkenyl aromatic monomer is styrene.

7. A process of claim 1, said first reaction zone operating with essentially constant fillage of 10 to 90% of its volume with said solution at a temperature of about 100° to 140° C. under a pressure of about 1 to 150 psig with isothermal and steady state polymerization.

8. A process of claim 1 wherein said second reaction zone is a staged, isobaric, stirred reaction zone, said partially polymerized solution being polymerized by progressive multistage substantially linear flow polymerization, all said stages operating with agitation and common evaporative vapor phase cooling under isobaric conditions, providing each said stage with steady state polymerization at a controlled temperature of about 130° to 180° C. and a pressure of about 7 to 28 psia.

9. A process of claim 1 wherein said solution has present about 0.001 to 3.0% by weight of a free radical generating catalyst.

10. A process of claim 9 wherein said free radical generating catalyst is selected from the group consisting of di-tert-butyl peroxide, tert-butyl peracetate, benzoyl peroxide, lauroyl peroxide, tert-butyl perbenzoate, dicumyl peroxide, tert-butyl peroxide and isopropyl carbonate or mixtures thereof.

11. A process of claim 1 wherein said solution comprises a solution of a diene rubber in styrene.

12. A process of claim 1 wherein said solution comprises a solution of a diene rubber dissolved in styrene and acrylonitrile.

13. A process of claim 12 wherein said styrene and acrylonitrile are present in amounts having a weight ratio of styrene to acrylonitrile of about 90:10 to 50:50.

14. A process of claim 1 wherein said polymer is polystyrene.

15. A process of claim 14 wherein said polystyrene has a weight average molecular weight of about 100,000 to 300,000.

16. A process of claim 1 wherein said polymer is a styrene-acrylonitrile polymer having a weight ratio of styrene to acrylonitrile of about 90:10 to 50:50.

17. A process of claim 16 wherein said styrene-acrylonitrile polymer has a weight average molecular weight of about 100,000 to 300,000.

18. A process of claim 1 wherein said matrix phase comprises a matrix polymer selected from the group consisting of a polystyrene and styrene-acrylonitrile polymer.

19. A process of claim 1 wherein said diene block copolymer has the structure: polybutadiene-polystyrene, having a weight ratio of polybutadiene to polystyrene of 95:5 to 60:40.

20. A process of claim 1 wherein said diene block copolymer has the structure: polystyrene-polybutadiene-polystyrene, having a weight ratio of polybutadiene to polystyrene of 95:5 to 60:40.

21. A process for the mass polymerization of monomer-rubber solutions comprising the steps:
A. continuously charging monomer having polybutadiene, butadiene-styrene block copolymer and polymer of said monomer dissolved therein to a first reaction zone operating at a steady-state polymerization conversion of about 20–45%, said monomer being styrene or a styrene-acrylonitrile mixture, said polymers being polystyrene or styrene-acrylonitrile copolymers forming a first partially polymerized mixture,
B. charging continuously said first mixture to a second polymerization zone operating at a steady-state polymerization conversion of about 50 to 85% forming a second partially polymerized mixture,
C. continuously separating residual monomers from said second mixture providing a polyblend with a matrix phase of said monomer having a dispersed mixed rubber phase of said polybutadiene and butadiene-styrene block copolymer, said rubber phase being dispersed as rubber particles having present about 1 to 5 parts of grafted and occluded polymers of said monomer per part of rubber.

22. A product of the process of claim 21.

* * * * *